(12) United States Patent
Hosier (10) Patent No.: US 7,755,418 B2
(45) Date of Patent: Jul. 13, 2010

(54) CURRENT SOURCE GENERATOR UTILIZING A PORTION OF A TARGETED ANALOG CIRCUIT

(75) Inventor: Paul A. Hosier, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1054 days.

(21) Appl. No.: 11/119,288

(22) Filed: Apr. 29, 2005

(65) Prior Publication Data

US 2006/0244651 A1    Nov. 2, 2006

(51) Int. Cl.
*H03B 1/00* (2006.01)
*G05F 1/10* (2006.01)
*G05F 3/02* (2006.01)

(52) U.S. Cl. .................. 327/538; 327/108; 327/109; 327/540; 327/541; 327/543

(58) Field of Classification Search ................ 327/108, 327/109, 540, 541, 543, 538; 323/312, 315, 323/316

See application file for complete search history.

(56) References Cited

U.S. PATENT DOCUMENTS

| | | | |
|---|---|---|---|
| 4,737,854 A | 4/1988 | Tandon et al. | |
| 4,820,971 A | 4/1989 | Ko et al. | |
| 5,081,536 A | 1/1992 | Tandon et al. | |
| 5,105,277 A | 4/1992 | Hayes et al. | |
| 5,493,423 A | 2/1996 | Hosier | |
| 5,638,121 A | 6/1997 | Hosier et al. | |
| 5,783,956 A * | 7/1998 | Ooishi | 327/157 |
| 6,654,058 B1 | 11/2003 | Hosier et al. | |
| 6,670,598 B1 | 12/2003 | Hosier et al. | |
| 6,677,809 B2 * | 1/2004 | Perque et al. | 327/541 |
| 6,814,485 B2 * | 11/2004 | Gauthier et al. | 374/170 |
| 2003/0107418 A1* | 6/2003 | Chang et al. | 327/156 |
| 2006/0012354 A1* | 1/2006 | Nunokawa et al. | 323/273 |

* cited by examiner

*Primary Examiner*—Lincoln Donovan
*Assistant Examiner*—Colleen O'Toole
(74) *Attorney, Agent, or Firm*—Maginot, Moore & Beck LLP (57) ABSTRACT

A reference level generator for driving an analog circuit to cyclically complete an analog function includes a portion of the analog circuit, a master clock, a control circuit, a detection circuit, an integrating circuit and a reference level circuit. The master clock operates at a master clock speed and provides master clock signals to the analog circuit utilized to complete the analog function. The control circuit is used to start and stop the operation of the portion of the analog circuit. The detection circuit is configured to determine when the analog function is completed and to provide an output indicative of the completion of the analog function. The integrating circuit is driven by the output of the detection circuit and configured to set an analog level that is function of the analog function completion time. The reference level circuit utilizes the analog level set by the integrating circuit for driving the analog circuit to induce the analog circuit to complete the analog function at a desired speed.

15 Claims, 8 Drawing Sheets

FIG. 9

CURRENT SOURCE GENERATOR UTILIZING A PORTION OF A TARGETED ANALOG CIRCUIT

BACKGROUND AND SUMMARY

This disclosure relates generally to current sources and more particularly to current source generator circuits utilizing a portion of a replicated analog circuit.

The power level in certain analog circuits is very important for various applications, especially when a given circuit may be repeated many times on an integrated circuit chip. For example, circuitry associated with an individual pixel (picture element), or row or column of pixels in an image sensor is repeated many times on the chip. Generally, the power level of the circuit will be set by the design to be at the highest level that is needed for specified range of data rates, temperature, power supply voltage and semiconductor process variations. This power design level results in much wasted power for nominal product running at normal environmental operating conditions and/or lower speed operation.

Figure 7:
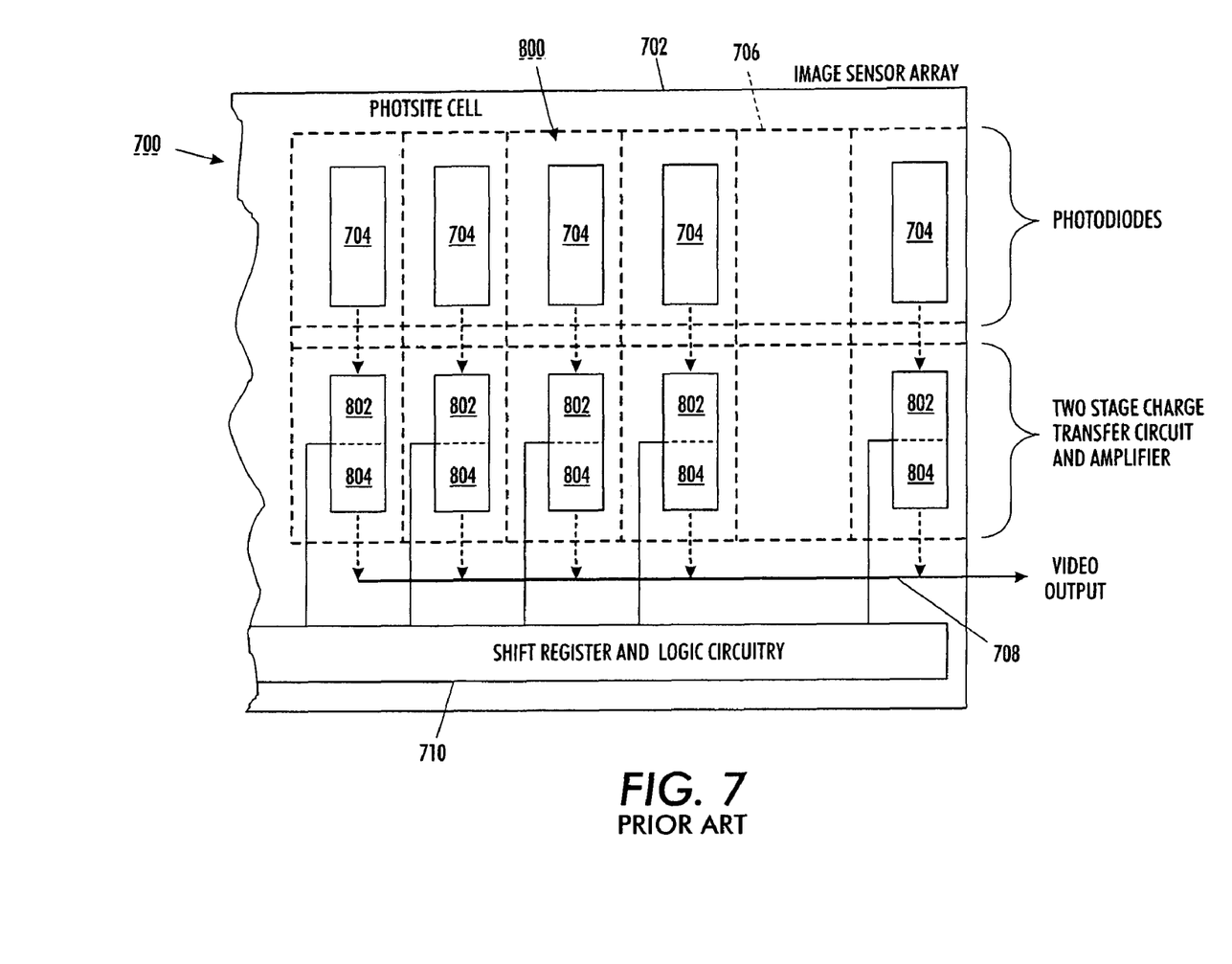
FIG. 7 is a schematic view of an image scanning array having an array of photosite cells, each cell having a photodiode with two stage transfer circuit and amplifier for transferring image signal charges from the photodiodes to a common output bus and incorporating the uniformity enhancing features of the current source generating circuit disclosed herein.

An example of a circuit that is replicated many times is the pixel circuitry shown in FIG. 7. In FIG. 7 there is shown the image sensor array with two stage transfer, designated generally by the numeral 700, of the type to which the present current source generator is directed. Image sensor array 700 includes a base or chip 702 of silicon with a plurality of photosites in the form of photodiodes 704 thereon. Photodiodes 704 are in closely spaced juxtaposition with one another on chip 702 in a linear array or row 706. Several smaller arrays such as array 700 can be abutted together end to end with one another to form a longer array, i.e. a full width or contact array, with spacing between the photodiodes 704 at the butted ends the same as the spacing between the photodiodes 704 inside the chip thereby maintaining photodiode pitch across the entire full width of the composite array.

While photodiodes 704 are shown and described herein, other photosite types such as amorphous silicon or transparent electrode MOS type photosites may be envisioned. Further, while a one dimensional sensor array having a single row 706 of photodiodes 704 is shown and described herein, a two dimensional sensor array with plural rows of photodiodes may be contemplated.

Figure 8:
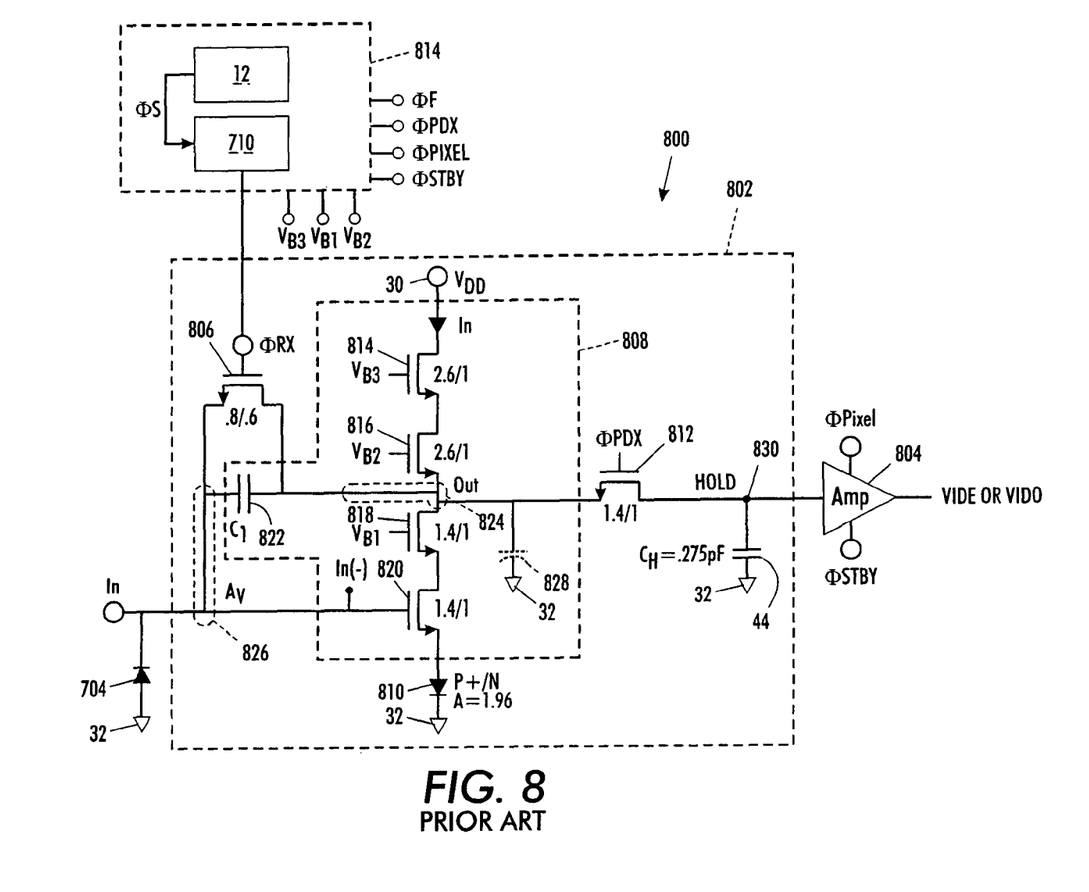
FIG. 8 is a schematic diagram showing a photosite cell and the amplifier with a transfer circuit of a pixel circuit for charge transfer and storage which may be replicated and a portion thereof utilized with the current source generating circuit utilizing a portion of a replicated analog circuit of FIG. 1.
Figure 9:
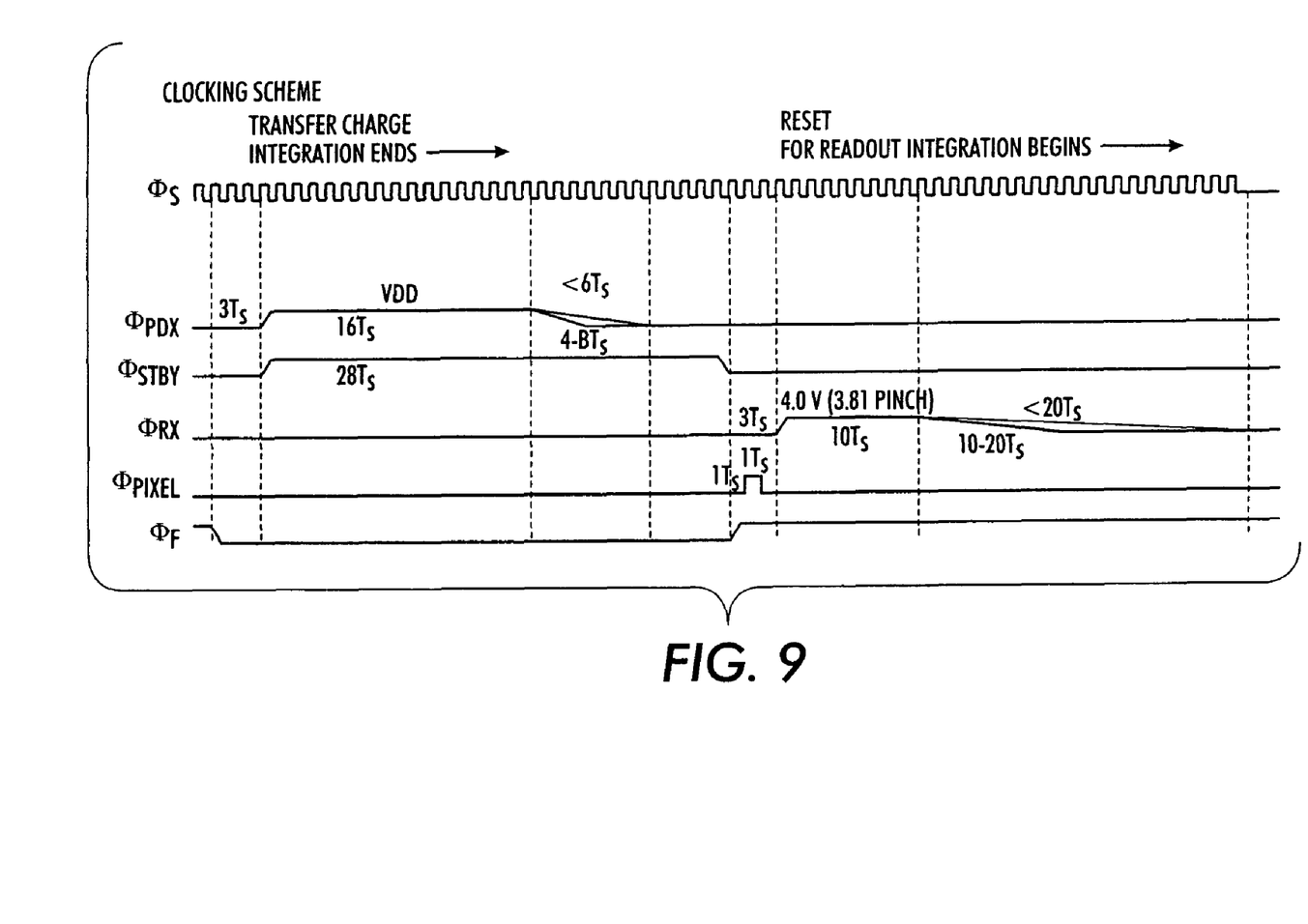
FIG. 9 is a timing diagram for pixel charge transfer and storage.

Each photodiode 704 has a two stage transfer circuit 802 associated therewith which together with the photodiode 704 and an amplifier 804 form a photosite cell 800 at the array front end. In each cell 800, the image signal charge from the photodiode 704 is transferred by circuit 802 to amplifier 804 where the image signal charge from photodiode 704 is amplified to bring the image signal charge to a desired potential level prior to transferring the charge to a common video output line or bus 708. Suitable shift register and logic circuitry 710 provide timing control signals $\Phi_{PIXEL}$ and $\Phi_{STDBY}$ for connecting each pixel cell 800 to bus 708 in the proper timed sequence.

Image sensor array 700 may for example be used to raster scan a document original, and in that application, the document original and the sensor array 700 are moved or stepped relative to one another in a direction (i.e., the slow scan direction) that is normally perpendicular to the linear axis of array 700. At the same time, the array 700 scans the document original line by line in the direction (i.e., the fast scan direction) parallel to the linear axis of the array. The image line being scanned is illuminated and focused onto the photodiodes 704. During an integration period, a charge is developed on each photodiode 704 proportional to the reflectance of the image area viewed by each photodiode 704. The image signal charges are thereafter transferred by two stage transfer circuits 802 via amplifier 804 to output bus 708 in a predetermined step by step timed sequence. The problem of high current in the pixel amplifier 804 is addressed by low power reset and sequential high power readout of each amplifier 804.

Reference is made to the following U.S. patents, the disclosures of which are hereby incorporated herein by this reference: U.S. Pat. No. 5,493,423, issued Feb. 20, 1996 to Hosier for a Resettable Pixel Amplifier for an Image Sensor Array; U.S. Pat. No. 6,670,598 issued Dec. 30, 2003 to Hosier, et al. for a Low Power Autozero of Pixel Amplifier; U.S. Pat. No. 5,638,121 issued Jun. 10, 1997 to Hosier, et al. for a High-speed Output of Video Image Data From An Array of Photosensors. These patents disclose alternative pixel circuits with which the disclosed current source may be utilized. U.S. Pat. Nos. 5,493,423 and 6,670,598 also explain some considerations for low power in the pixel circuits of the prior image sensors. U.S. Pat. No. 5,638,121 explains another additional method to improve the serial output speed of the image sensor chip with minimum power increase.

Referring particularly to FIG. 8, the two stage transfer circuit 802 associated with each cell 800 includes a reset transistor 806, a cascode amplifier 808, a biasing diode 810, a pass transistor 812 and a hold capacitor $C_H$ 44. In the illustrated embodiment, cascode amplifier 808 is configured as a trans-impedance amplifier for transferring the image signal charge from the photodiode 704 to amplifier 804.

A suitable clock source 814, which may include the master clock 12 and portions of the shift register and logic circuitry 710 as well as other components, provides bias voltages $V_{B1}$, $V_{B2}$ and $V_{B3}$ as well as pulses $\Phi_S$, $\Phi_{RX}$, $\Phi_{PDX}$, $\Phi_{PIXEL}$ and $\Phi_{STDBY}$. The $\Phi_{PIXEL}$ and $\Phi_{STDBY}$ signals for multiplexing the amplified charge output by amplifier 804 onto the common video output bus 708 are typically provided by shift register and logic circuitry 710.

In operation the reset pulse $\Phi_{RX}$ actuates reset transistor 806 and $\Phi_{PDX}$ actuates pass transistor 812 to read out the integrated voltage from node 824 onto the reset or storage node 830. To read out the video signals from the various amplifiers 804 onto the video bus in an orderly manner, signal pulses $\Phi_{PIXEL1}$, $\Phi_{PIXEL2}$, $\Phi_{PIXEL3}$ . . . activate the respective amplifiers 804 of the replicated circuits 800 in quick succession. After the image signal has been transferred to the reset node input of the amplifier 804, the photodiodes 704 can be reset and biased for the next light integration period. This can occur during the readout of the amplifiers 804.

In the pixel circuitry of FIG. 8, the high power amplifier 804 is used for high speed serial readout of a linear sensor array 700. In addition, a cascode amplifier 808 is associated with each photodiode cell 800 of the image sensor array 700. The cascode amplifier 808 is of the type commonly referred to as a trans-impedance amplifier. This trans-impedance amplifier 808 is used to integrate charge, with high sensitivity and low noise. In the illustrated embodiment, the trans-impedance amplifier 808 comprises a first source transistor 40, a second transistor 816, a third transistor 818, a fourth transistor 820 and a reset capacitor ($C_R$) 822. In the illustrated embodiment, the first source transistor 40 and second transistor 816 are CMOS P-device transistors having a gate width to length ratio of 2.6/1. The third transistor 818 and fourth transistor 820 are CMOS N-device transistors each having a gate width to length ratio of 1.4/1.

The drain of the first source transistor 40 is coupled to $V_{DD}$ 30. The gate of the first source transistor 40 is coupled to the third bias voltage $V_{B3}$. The source of the first source transistor 40 is coupled to the drain of the second transistor 816. The gate of the second transistor 816 is coupled to the second bias voltage $V_{B2}$. The source of the second transistor 816 is coupled to an output node 824. The source of the third transistor 818 is also coupled to the output node 824. The gate of the third transistor 818 is coupled to the first bias voltage $V_{B1}$. The drain of the third transistor 818 is coupled to the source of the fourth transistor 820. The drain of the fourth transistor 820 is coupled to the anode terminal of the biasing diode 810 which has its cathode terminal coupled to ground 32.

The biasing diode 810 acts to bias the cascode amplifier 808 so that the voltage on the output node 824 is raised. This adjusts the output present at the output node 824 of the cascode amplifier 808 to a reasonable level.

The gate of the fourth transistor 820, which acts as the input to the cascode amplifier 808 is coupled to the cathode of the photodiode 704 through an input node 826. The reset capacitor $(C_R)$ 822 has its electrodes coupled across output node 824 and the input node 826.

The reset transistor 806 is a CMOS N-device transistor having a gate width to length ration of 0.8/0.6. The reset transistor 806 has its gate coupled to the reset signal $\Phi_{RX}$ generated by the clock circuit 814. The drain of the reset transistor 806 is coupled to the input node 826 and the source of the reset transistor 806 is coupled to the output node 824. The reset transistor 806 acts to reset the cascode amplifier 808 by discharging the reset capacitor $(C_R)$ 822. The cascode amplifier 808 has a parasitic capacitance 828 represented in phantom lines in FIG. 8.

The details of operation of this circuit are discussed in other papers and textbooks and are not important for the understanding of the current source generating circuit 10 disclosed herein. However, those skilled in the art will recognize that the cascode amplifier 808 amplifies the output of the photodiode 704 and transfers a voltage, which is proportional to the integrated photo-generated charge, to the hold capacitor $(C_H)$ 44. The pass transistor 812 having its drain coupled to the output node 824 and source coupled to the hold node 830 controls the transfer of this voltage to the hold capacitor $(C_H)$ 44 in response to the state of the signal present on the gate of the transistor 812. The hold capacitor $(C_H)$ 44 is coupled between the hold node 830 and ground 32. The hold node 830 is also coupled to the input of the amplifier 804.

Those skilled in the art will recognize that the power of the cascode amplifiers 808 should preferably be minimized because of the large number of them on a chip. Despite the low power requirement, the cascode amplifier 808 must still be able to transfer the charge to the storage node 830, or hold capacitor $(C_H)$ 44, in a relatively short amount of time so as not to increase the readout line period anymore than necessary. If the sensor is designed for multiple speed operations, such as 1 MHz and 40 MHz, it is not desirable to penalize the lower power application with the power necessary for 40 MHz.

As an aid to further understanding the background to which the disclosed current generator relates, reference is made to the following U.S. patents, the disclosure of which are incorporated herein by this reference: U.S. Pat. No. 5,105,277 issued Apr. 14, 1992 to Hayes, et al. for a Sensor Array with Improved Uniformity; U.S. Pat. No. 5,081,536 issued Jan. 14, 1992 to Tandon, et al. for a Sensor Array with Improved Bias Charge Injection; and U.S. Pat. No. 4,737,854 issued Apr. 12, 1988 to Tandon, et al. for an Image Sensor Array with Two-Stage Transfer. U.S. Pat. Nos. 5,105,277, 5,081,536 and 4,737,854 explain the front end portion of the pixel circuits of other existing image sensor chips that are different than the front end of the pixel circuits 800 of FIG. 8.

The disclosed current source generator circuit generates a current source utilized used to set the power of an analog circuit. The current generated is adjusted to an appropriate level for varying operating conditions. A portion of the targeted analog circuit is used in the current source generator circuit. In addition, the current source generator circuit detects when the desired function of this analog circuit is completed. The current source generator circuit includes a master clock and a feedback loop to make the completion of the desired function happen slower or faster until the desired speed is obtained.

According to one aspect of the disclosure, a current source generator utilizing a portion of an analog circuit for driving the analog circuit to cyclically complete an analog function is disclosed. The current source generator comprises a portion of the analog circuit, a control clock circuit, a detection circuit, a phase weighted integrating circuit and a current source. The control clock circuit is used to start and stop the operation of the portion of the analog circuit. The detection circuit is configured to determine when the analog function is completed and provide an output indicative of the completion of the analog function. The phase weighted integrating circuit is driven by the output of the detection circuit and is configured to set an analog level that is function of the analog function completion time. The current source utilizes the analog level set by the integrating circuit as a reference level for driving the analog circuit to induce the analog circuit to complete the analog function at a desired speed.

According to another aspect of the disclosure, a current source generator utilizing a portion of a replicated analog circuit for driving the replicated analog circuit to cyclically complete an analog function is disclosed. The current source generator comprises a master clock, a portion of the replicated analog circuit, a current source and a feedback loop. The master clock has master clock speed of operation. The portion of the replicated analog circuit generates an output signal. The current source is configured to drive the portion of the replicated analog circuit. The feedback loop receives the output signal and generates an analog reference level output to the current source to induce the analog circuit function to be completed at a speed directly proportional to the master clock speed of operation.

According to yet another aspect of the disclosure, a reference level generator utilizing a portion of a replicated analog circuit for driving the replicated analog circuit to cyclically complete an analog function is disclosed. The reference level generator comprises a portion of the replicated analog circuit, a master clock, a control circuit, a detection circuit, an integrating circuit and a reference level circuit. The master clock operates at a master clock speed and provides master clock signals to the replicated analog circuit utilized to complete the analog function. The control circuit is used to start and stop the operation of the portion of the replicated analog circuit. The detection circuit is configured to determine when the analog function is completed and to provide an output indicative of the completion of the analog function. The integrating circuit is driven by the output of the detection circuit and configured to set an analog level that is function of the analog function completion time. The reference level circuit utilizes the analog level set by the integrating circuit for driving the replicated analog circuit to induce the replicated analog circuit to complete the analog function at a desired speed.

Additional features and advantages of the presently disclosed current source generator circuit will become apparent to those skilled in the art upon consideration of the following detailed description of embodiments exemplifying the best mode of carrying out the disclosure as presently perceived.

BRIEF DESCRIPTION OF THE DRAWINGS

A more complete understanding of the disclosed apparatus can be obtained by reference to the accompanying drawings wherein.

Corresponding reference characters indicate corresponding parts throughout the several views. Like reference characters tend to indicate like parts throughout the several views.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Figure 1:
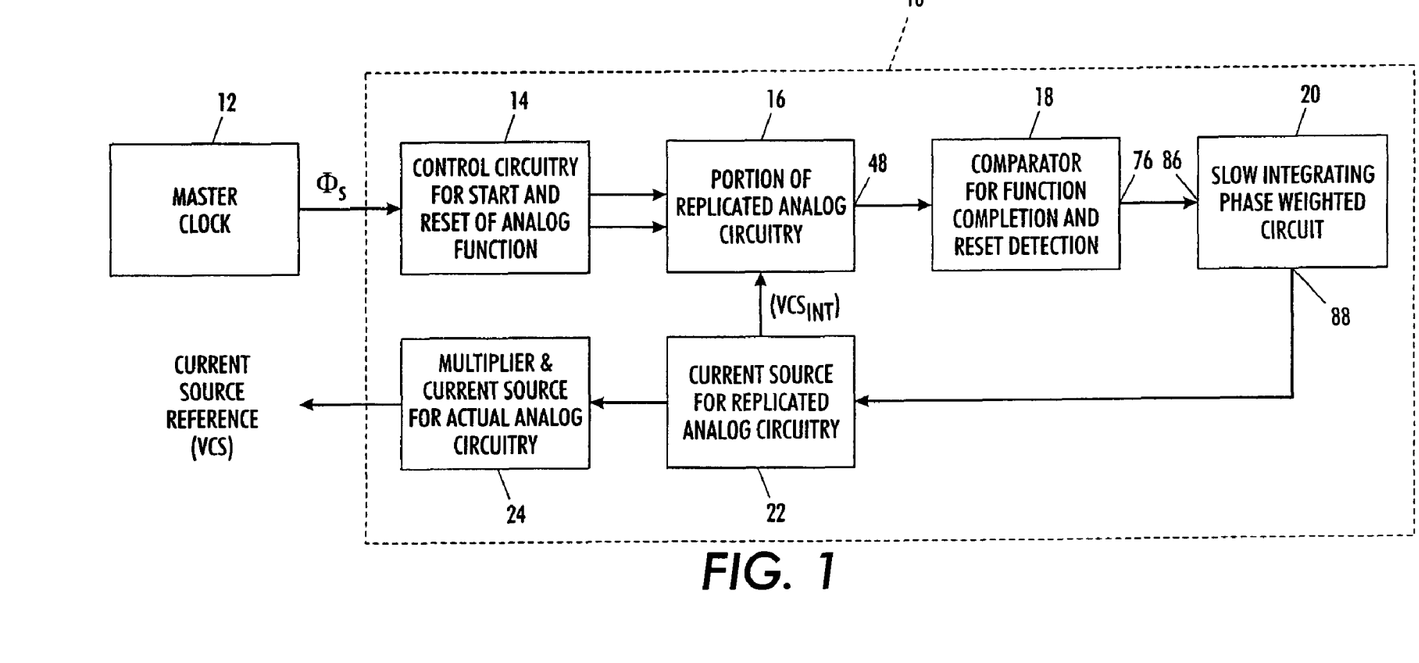
FIG. 1 is a block diagram of the current source generating circuit utilizing a portion of a replicated analog circuit.

A block diagram of the current source generating circuit 10 utilizing a portion of a replicated analog circuit is shown in FIG. 1. The current source generating circuit 10 receives a clock signal $\Phi_S$ from a master clock 12. The current source generating circuit 10 includes a control circuit 14, a portion 16 of the replicated analog circuit 800, a buffered comparator circuit 18, a slow integrating phase weighted circuit 20, a current source for the replicated circuit 22, and may include a multiplier and ripple damping circuit 24 creating a current source for the actual analog circuitry. The control circuit 14 is utilized for starting and resetting of the analog function performed by the analog circuit 800. The control circuit 14 comprises a control clock or other circuitry 46 configured to start and stop the operation of a portion 16 of the replicated analog circuitry 800. In the illustrated embodiment, the control circuit 14 comprises a pull down transistor 46 (FIG. 2) having its gate coupled to the main clock 12 to be controlled by the clock pulse $\Phi_S$. Illustratively, pull down transistor 46 is a CMOS N-device transistor having a gate width to length ratio of 1.4/0.6 to quickly pull down the charge across the hold capacitor ($C_H$) 44. The drain of the pull down transistor 46 is coupled to ground 32 and the source is coupled to the output node 48 of the portion 16 of the replicated analog circuit 800.

Figure 2:
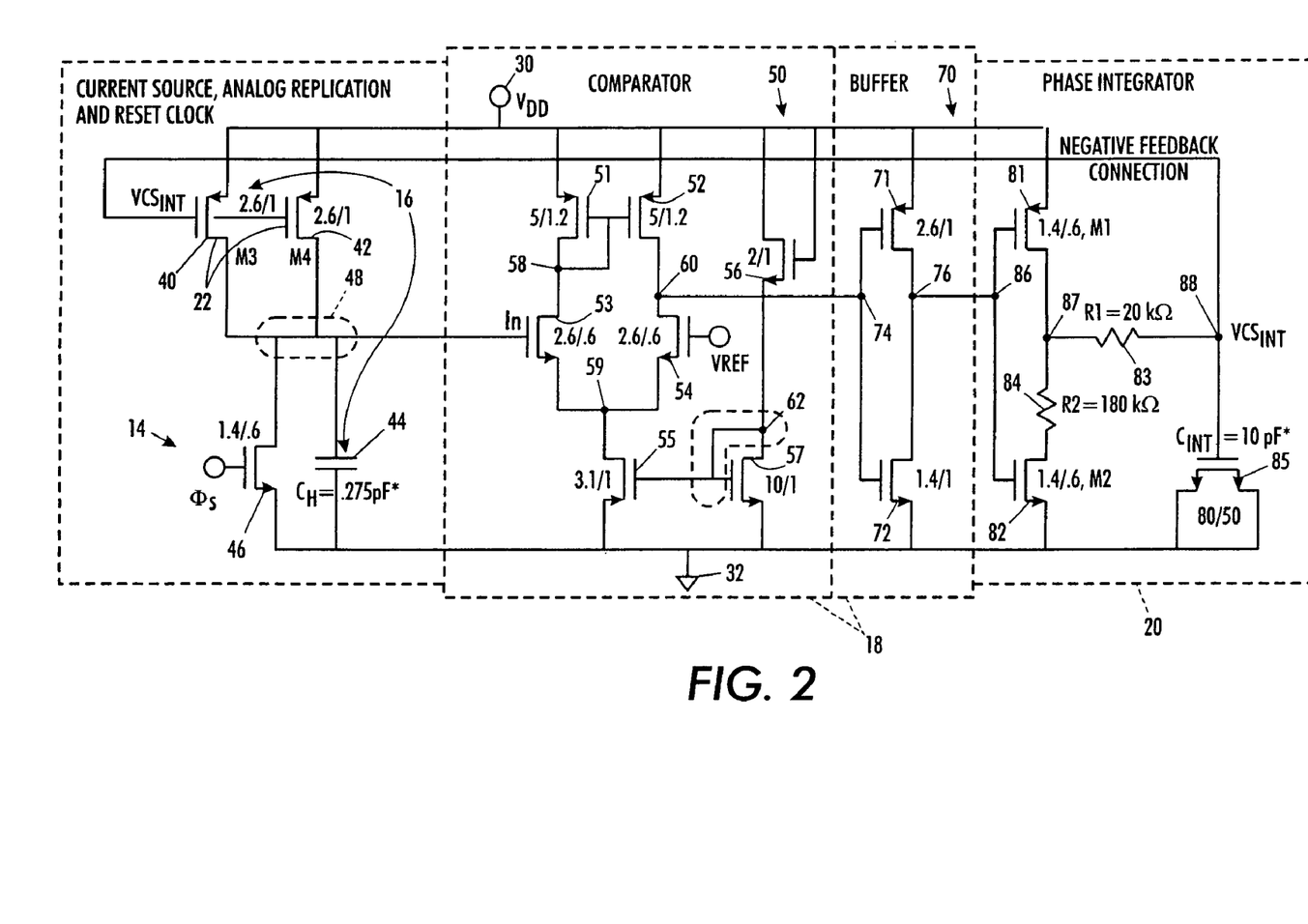
FIG. 2 is a schematic diagram of the current source, analog replication, reset clock, comparator, buffer and phase integrator of the current source generating circuit utilizing a portion of a replicated analog circuit of FIG. 1.

In the illustrated embodiment, as shown, for example, in FIG. 2, the portion 16 of the replicated analog circuit 800 is the first source transistor (M3) 40 and the hold capacitor ($C_H$) 44. The first source transistor (M3) 40 is replicated with second source transistor (M4) 42 to act as a 2× multiplier to charge the replicated circuit 800 twice as quickly. Illustratively the gates of both source transistors 40 and 42 are coupled to the $VCS_{INT}$ signal generated by the phase integrator 20 as a negative feedback signal. The drains of both source transistors 40 and 42 are coupled to $V_{DD}$ 30. The sources of both source transistors 40 and 42 are coupled to the output node 48.

Those skilled in the art will recognize that the first source transistor 40 in the cascode amplifier 808 of the replicated analog circuit 800 in essence acts as a power source for the cascode amplifier 808 of the replicated analog circuit 800. Thus, the first source transistor (M3) 40 can be considered a component of both the portion 16 of the replicated circuit 800 and a portion of the current source 22 for the replicated analog circuit 800. The current source 22 for the replicated analog circuit 800 also includes the second source transistor (M4) 42.

Figure 4:
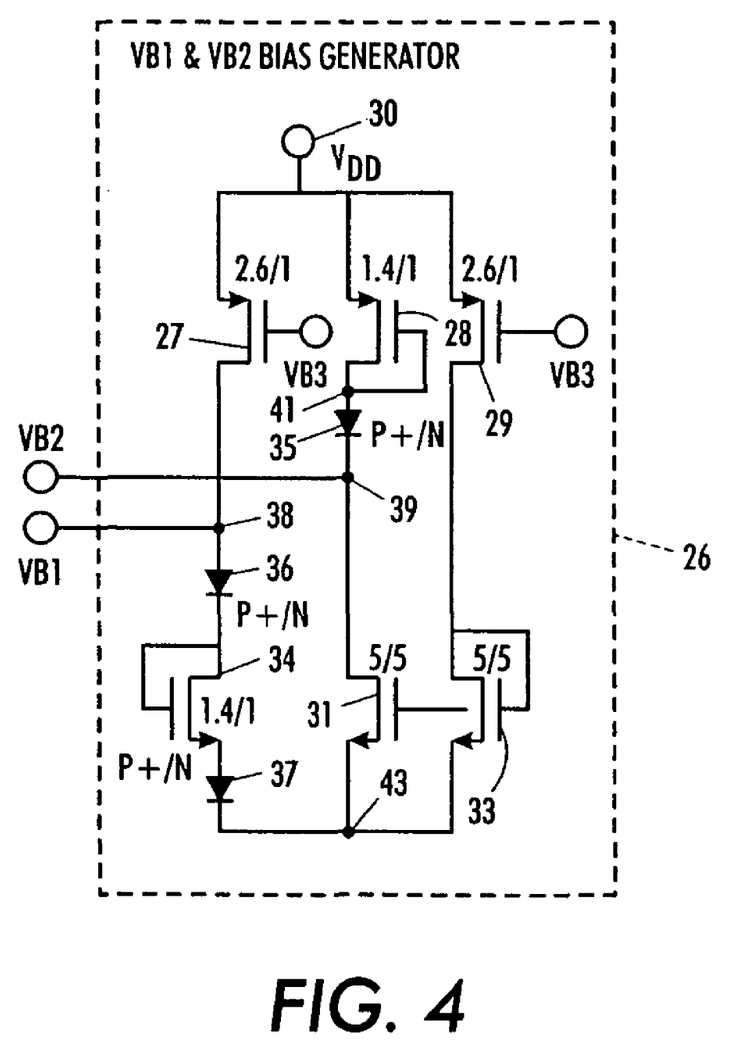
FIG. 4 is a schematic diagram of a bias generator.

In the illustrated embodiment, the $V_{B1}$, and $V_{B2}$ bias generator 26 comprises a first transistor 27, a second transistor 28, a third transistor 29, a fourth transistor 31, a fifth transistor 33, a sixth transistor 34, a first diode 35, a second diode 36, a third diode 37, a $V_{B1}$ output node 38 and a $V_{B2}$ output node 39. Illustratively, the first transistor 27, second transistor 28 and third transistor 29 are each a CMOS P-device transistor. The first and third transistors 27, 29 both have a gate width to length ratio of 2.6/1 while the second transistor 28 has a gate width to length ratio of 1.4/1. The fourth, fifth and sixth transistors 31, 33, 34 are each a CMOS N-device transistor. The fourth and fifth transistors 31, 33 both have a gate width to length ratio of 5/5 while the sixth transistor 34 has a gate width to length ratio of 1.4/1.

Figure 5:
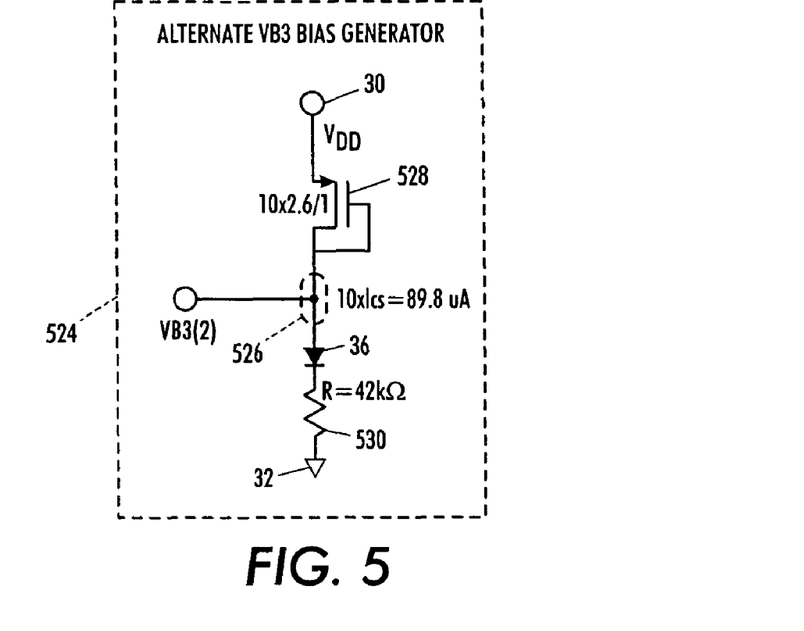
FIG. 5 is a schematic diagram of an alternate bias generator.

Both the first and third transistors 27, 29 have their gates coupled to the third bias voltage $V_{B3}$ which may be generated by the multiplier and ripple damping circuit 24 (FIG. 3) or the alternative $V_{B3}$ bias generator circuit 524 (FIG. 5). The drains of the first, second and third transistors are coupled to $V_{DD}$ 30. The source of the first transistor 27 is coupled to the $V_{B1}$ output node 38. The source of the second transistor 28 is coupled to a node 41 that is coupled to the gate of the second transistor 28 and the anode terminal of the first diode 35. The cathode of the first diode 35 is coupled to the $V_{B2}$ output node 39. The source of the third transistor 29 is coupled to the source and gate of the fifth transistor 33 and to the gate of the fourth transistor 31. The source of the fourth transistor 31 is coupled to the $V_{B2}$ output node 39. The drains of the fourth and fifth transistors 31, 33 are coupled to node 43. The drain of the sixth transistor 34 is coupled to the anode of the third diode 37 that has its cathode coupled to node 43. The source and gate of the sixth transistor 34 are coupled to the cathode of the second diode 36 that has its anode coupled to the $V_{B1}$ output node 38.

In the illustrated embodiment, the buffered comparator circuit 18 includes a comparator circuit 50 and a buffer circuit 70. The comparator circuit 50 is a detector or comparator circuit that compares the In signal present on the output node 48 of the portion 16 of the analog circuit 800 to the reference voltage $V_{REF}$ to determine when the analog function is completed. The comparator circuit 50 presents an output signal on its output node 60 indicative of the state of completion of the analog function.

The illustrated comparator circuit 50 comprises seven CMOS transistors 51, 52, 53, 54, 55, 56, 57. The first and second transistors 51, 52 are both CMOS P-device transistors having a gate width to length ratio of 5/1.2. The third, fourth, fifth, sixth and seventh transistors 53, 54, 55, 56, 57 are CMOS N-device transistors. The third and fourth transistors 53, 54 have a gate width to length ratio of 2.6/0.6. The fifth transistor 55 has a gate width to length ratio of 3.1/1. The sixth transistor 56 has a gate width to length ratio of 2/7. The seventh transistor 57 has a gate width to length ratio of 10/1.

The first transistor 51 has its drain terminal coupled to $V_{DD}$ 32 and its source terminal coupled to a node 58. The node 58 is coupled to the source terminal and the gate terminal of the first transistor 51, to the gate terminal of the second transistor 52 and to the source terminal of the third transistor 53. The gate terminal of the third transistor 53 is coupled to the In signal present at the output node 48 of the portion 16 of the replicated circuit 800. The drain terminal of the third transistor 53 is coupled to a node 59. The node 59 is coupled to the drain terminal of the third transistor 53, the source terminal of the fifth transistor 55 and the drain terminal of the fourth transistor 54. The source terminal of the second transistor 52 is coupled to an output node 60. The output node 60 is coupled to the source terminal of the second transistor 52 and to the source terminal of the fourth transistor 54. The output node 60 of the comparator circuit is also coupled to the input node 74 of the buffer circuit 70. The signal indicative of whether the analog function is complete is present at node 60.

Figure 6:
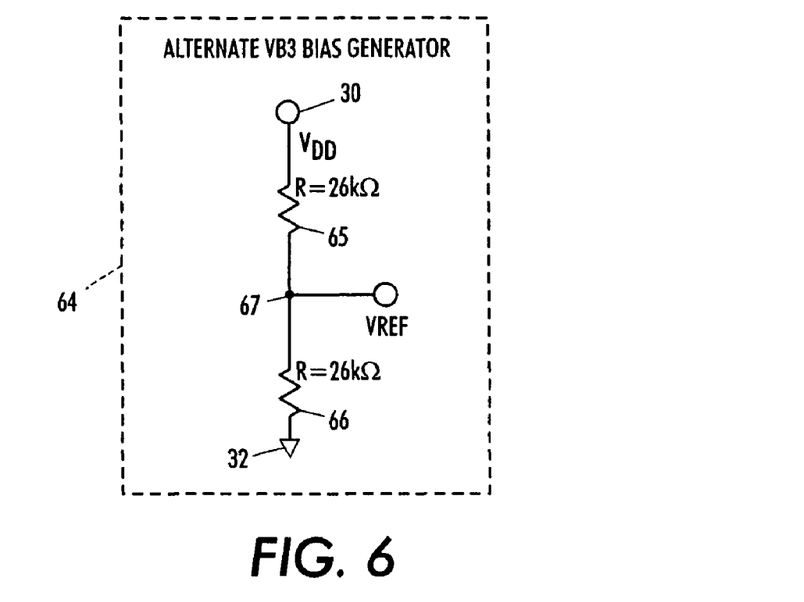
FIG. 6 is a schematic diagram of a reference voltage generator circuit.

The gate of the fourth transistor 54 is coupled to the reference voltage $V_{REF}$ signal generated by the $V_{REF}$ generator circuit 64 (FIG. 6). The $V_{REF}$ generator circuit 64 is a simple voltage divider circuit. The $V_{REF}$ generator circuit 64 comprises a first resistor 65, a second resistor 66 and an output node 67. The first resistor 65 is coupled at one terminal to $V_{DD}$ 30 and at the other terminal to the $V_{REF}$ node 67. The second resistor 66 is coupled at one terminal to ground 32 and at the other terminal to $V_{REF}$ node 67. In the illustrated embodiment the resistance of the first resistor 65 is equal to the resistance of the second transistor 66. Illustratively the resistance of the first and second resistors 65, 66 is 26 kΩ. Thus, the reference voltage $V_{REF}$ present at the $V_{REF}$ output node 67 is equal to one half the voltage of $V_{DD}$ 30.

The source of the fifth transistor 55 is coupled to the node 59. The drain of the fifth transistor 55 is coupled to ground 32. The gate of the fifth transistor is coupled to a node 62. The node 62 is coupled to the gate of the fifth transistor 55, the gate and source of the seventh transistor 57 and the drain of the sixth transistor 56. The drain of the seventh transistor 57 is coupled to ground 32. The source and gate of the sixth transistor 56 are coupled $V_{DD}$ 30.

The buffered comparator circuit 18 is configured to provide an inverted buffered digital output indicative of whether or not the analog function of the analog circuit 800 is complete. In the illustrated embodiment, the buffer circuit 70 comprises two CMOS transistors 71 and 72 configured as an inverter and coupled in series between $V_{DD}$ 30 and ground 32 and controlled by the output signal of the comparator circuit 50. The first and second transistor 71 is a CMOS P-device transistor having a gate width to length ratio of 2.6/1. The second transistor 72 is a CMOS N-device transistor having a gate width to length ratio of 1.4/1.

The output signal present at the output node 62 of the comparator circuit 50 acts as an input signal to the buffer circuit 70 and is thus coupled through input node 74 to the gate of the first transistor 71 and the gate of the second transistor 72 of the buffer circuit 70. The drain of the first transistor 71 is coupled to $V_{DD}$ 30 and the drain of the second transistor 72 is coupled to ground 32. The source of the first transistor 71 and the source of the second transistor 72 are coupled to the output node 76 of the buffer circuit 70. Thus, the buffer circuit 70 receives the unbuffered output of the comparator circuit 50 at its input node 74 and presents a buffered output signal indicative of the completion state of the analog function at its output node 76.

In the illustrated embodiment, the phase integrator circuit 20 comprises a first transistor (M1) 81, a second transistor (M2) 82, a first resistor ($R_1$) 83, a second resistor ($R_2$) 84 and a capacitance transistor 85. The first transistor (M1) 81 is a CMOS P-device transistor having a gate width to length ratio of 1.4/0.6. The second transistor (M2) 82 and capacitance transistor 85 are CMOS N-device transistors. The second (M2) transistor 82 has a gate width to length ratio of 1.4/0.6. The capacitance transistor 85 has a gate width to length ratio of 80/50 creating a very large gate area that acts as a dielectric between the gate and the drain and source which are both coupled to ground.

The gates of the first and second transistors 81, 82 are coupled to the input node 86 of the phase integrator circuit 20 and thus receive the buffered digital output signal present on the output node 76 of the buffer circuit 70 of the buffered comparator circuit 18 as a control signal driving the phase integrator circuit 20. The drain of the first transistor 81 is coupled to $V_{DD}$ 30 and the drain of the second transistor 82 is coupled to ground 32. The source of the second transistor is coupled through the second resistor ($R_2$) 84 to a node 87. The source of the first resistor 81 is coupled directly to node 87. Node 87 is coupled through the first resistor ($R_1$) to the negative feedback output node 88 of the phase integrator circuit 20. The negative feedback output node 88 is coupled to the gate of the capacitance transistor 85 and the source and drain of the capacitance transistor 85 are both coupled to ground 32. Illustratively capacitance transistor 85 acts as a relatively large damping capacitor $C_{INT}$ that controls ripple for the $VCS_{INT}$ signal present at the feedback output node 88.

Thus, the digital output of the buffered comparator circuit 18 acts as an input to and drives the phase weighted integrating circuit 20 to set an analog level that is function of the time of the analog function's completion time. This analog level is used as the reference level for a current source 22 or some other type of circuit that drives the replicated analog circuitry 800. If this entire feedback loop has negative feedback, the analog level will settle at some equilibrium level that is a function of percent of cycle time needed to complete the analog operation and the characteristic ratios in the integrating circuit 20. An optional multiplier and ripple damping circuit 24 (FIG. 3) may be added to adjust the current source level for a proportional, but different, analog operation completion time in the actual active circuit 800.

More specifically for the circuit of FIG. 2, if Ts is the period of the master clock 12, $\phi_S$, and f is fraction of the time the comparator output is "high", then the replicated analog operation will be completed in a time $(0.5-f)*T_S$. If the integrating circuit switches formed by the first transistor (M1) 81 and the second transistor (M2) 82, are ideal:

$$\frac{f}{(1-f)} = \left[\frac{VCS_{INT}}{V_{DD} - VCS_{INT}}\right] * \left[\frac{R_1}{R_1 + R_2}\right]$$

If the first resistor ($R_1$) 83 and second resistor ($R_2$) 84 are large enough, the CMOS transistor impedance of the first transistor (M1) 81 and the second transistor (M2) 82 is almost insignificant and the switches behave in a nearly ideal manner. If $R_1 \ll R_2$, then f becomes very small and the analog operation completion time, $(0.5-f)*T_S$, approaches $0.5*T_S$.

Depending on the requirements of analog completion time in the actual circuit 800, the multiplier and ripple damping circuit 24 (FIG. 3) can be used to scale $0.5*T_S$ up or down, as needed. The multiplier and ripple damping circuit 24 receives the current source internal reference signal $VCS_{INT}$ as an input and outputs a current source reference signal VCS that can serve as third bias voltage $V_{B3}$ at its output node 90. In the illustrated embodiment, the multiplier and ripple damping circuit 24 comprises the current source voltage output node 90, a first transistor 91, a second transistor 92, a third transistor 93, a fourth transistor 94, a fifth transistor 95, a sixth transistor 96 and a seventh transistor 97. The first and second transistors 91, 92 are both CMOS P-device transistors having a gate width to length ratio of 2.6/1. The third, fourth, fifth, sixth and seventh transistors 93, 94, 95, 96, 97 are CMOS N-device transistors. The third, fourth and fifth transistors 93, 94 and 95 have a gate width to length ratio of 5/5. The sixth and seventh transistors 96, 97 have a gate width to length ratio of 80/50.

Figure 3:
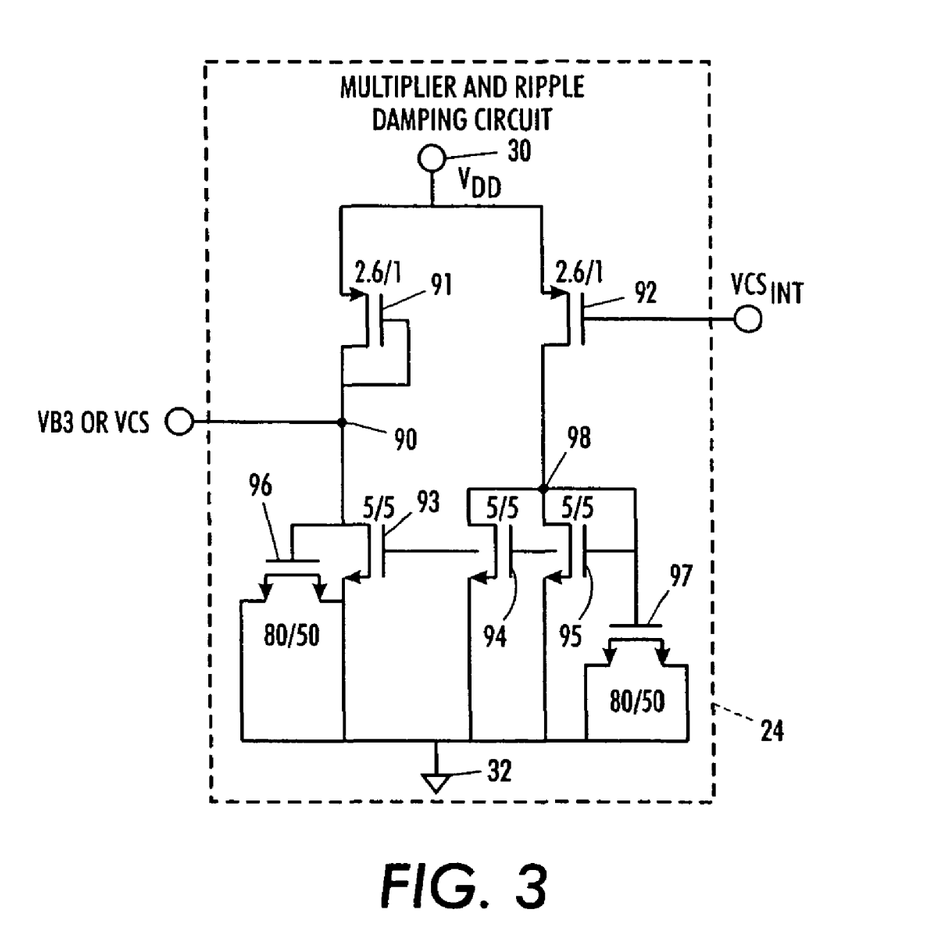
FIG. 3 is a schematic diagram of a multiplier and ripple damping circuit that can be added to the circuit of FIG. 2 to improve performance.

Illustratively the drains of the first and second transistors 91, 92 are coupled to VDD 30. The source and gate of the first transistor 91 is coupled to the output node 90. The gate of the second transistor 92 acts as the input to the multiplier and ripple damping circuit 24 and is thus coupled to the internal current source voltage signal $VCS_{INT}$ on the output node 88 of the phase integrator circuit 20. The source of the second transistor 92 is coupled to a node 98 that is also coupled to the gate of the third transistor 93, the gate and source of the fourth transistor 94, the gate and source of the fifth transistor 95 and the gate of the seventh transistor 97. The drains of the third fourth and fifth transistors 93, 94, 95 and the sources and drains of the sixth and seventh transistors 96, 96 are all coupled to ground 32. The gate of the sixth transistor 96 and the source of the third transistor are coupled to the output node 90. Due to the large area of their gates and the fact that both of their sources and drains are coupled to ground 32, the sixth and seventh transistors 96, 97 act as damping capacitors to reduce the ripple on the VCS (or $V_{B3}$) signal present at the output node 90. When the optional multiplier and ripple damping circuit 24 is utilized the input node 92 is coupled to the gates of the first and second source transistors 40, 42 and the output node 90 is coupled to the input formed by the gate of the third transistor 29 of the $V_{B1}$ and $V_{B2}$ bias generator circuit 26.

The first, second, third, fourth and fifth transistors 91, 92, 93, 94, 95 cooperate to form the multiplier circuit that multiplies the value of $VCS_{INT}$ in accordance with their design parameters. In the illustrated embodiment, a ¹⁄₁₀× multiplier in the current source of the multiplier and ripple damping circuit 24 would result in $5*T_S$ completion time in the circuit.

When the current source generator 10 is fabricated without the optional multiplier and ripple damping circuit 24, the current source 22 includes the alternative $V_{B3}$ bias generator 524, shown for example in FIG. 5. The $V_{B3}$ bias generator 524 includes an output node 526, a transistor 528 and a resistor 530. Illustratively, transistor 528 is a set of ten parallel CMOS P-device transistors, each having a gate width to length ratio of 2.6/1. The transistor acts as a ¹⁄₁₀× multiplier on the current in circuit 808 with respect to the current in circuit 524. The drain of the transistor 528 is coupled to $V_{DD}$ 30. The source and gate of the transistor 528 is coupled to the output node 526. The resistor 530 is coupled at one terminal to the output node 526 and at the other terminal to ground 32. Illustratively, the resistor 530 is a 42 kΩ resistor. The third bias voltage $V_{B3}$ is present at the output node 526 of the $V_{B3}$ bias generator 524. When the optional multiplier and ripple damping circuit 24 is not utilized, the output node 526 of the $V_{B3}$ bias generator 524 is coupled to the input formed by the gate of the third transistor 29 of the $V_{B1}$ and $V_{B2}$ bias generator circuit 26.

It should be noted the current source reference voltage $VCS_{INT}$ will be set to reach an equilibrium that is a function of design parameters mentioned above, which include $T_S$. Therefore, if the analog operation completion time requirement is a function of N number of $T_S$ cycles, the current source generating circuit 10 sets the current source reference voltage $VCS_{INT}$ automatically to the right level that is a function of $T_S$. In addition, it can be seen that if the resistance of $R_1 \ll R_2$, the $VCS_{INT}$ and $V_{DD}$ voltage levels, and any threshold voltage levels that determine the voltage level of $VCS_{INT}$ are not important factors in affecting the value of 0.5−f, since f is so small. The net result is that the current source generator 10 is not very sensitive to $V_{DD}$, temperature, semiconductor process parameters, and therefore the current source generator 10 will not have much variation due to those parameters. Since a portion 16 of the replicated analog circuitry 800 is used in this frequency dependent current source generator 10, even the variations of the semiconductor process in these devices does not affect the desired settling time or analog operation completion time, although the current source level $VCS_{INT}$ will vary to account for the variation in these devices.

There are many small practical considerations in designing such a frequency dependent current source generating circuit 10. As already mentioned, there needs to be negative feedback between the analog operation block input and output of the phase integrator 20 so that the reference level $VCS_{INT}$ reaches some equilibrium value. The inverting buffer 70 was inserted for this reason. The first resistors R1 and second resistor R2 in combination with $C_{INT}$, will determine the start-up time and ripple on the $VCS_{INT}$ voltage level. The ripple should be minimized for obvious reasons. In this particular application, more ripple reduction in the final current source reference level, VCS (or VB3), is achieved in the multiplier and ripple damping circuit 24 of FIG. 3 wherein the large sixth and seventh transistors 96, 97 act as damping capacitors.

As mentioned previously, the replicated analog portion 16 includes the hold capacitor ($C_H$) 44 and the first source transistor 40 of FIG. 8. Since the voltage swing on the hold capacitor $C_H$ 44 of the replicated portion 16 is about twice the swing of pixel circuit 800, two current source transistors 40, 42 were used in the current source generator 10 in place of the one source transistor 40 in the pixel circuit 800. Of course, this ratio could also be handled in the multiplier and ripple damping circuit 24, if needed. There are several other common circuit design considerations for the design of the buffered comparator circuit 18, device sizes in all circuits, etc that are well known to those of ordinary skill in the art.

At a given speed of operation, the current source variation due to $V_{DD}$, temperature and semiconductor process are minimized. Since many of the pixel circuits 800 are replicated on the chip 702, this results in a tighter power specification. In practice, the tolerance was reduced from about ±30% to about ±10% on a recent tested design. Even the possible problems of modeling errors are minimized by the replication of the analog circuit portion 800 and the insensitivity of the (0.5−f) factor. For variable speed operation, the pixel circuit 800 works at all frequencies with as little power needed as possible for each frequency. The disclosed current source generator circuit 10 has a power level that is almost directly proportional to frequency and works up to 40 MHz. For lower speeds, much power is conserved on chip since the power requirement of the pixel circuit 800 drops with frequency.

The disclosed current source generator circuit 10 addresses the need to minimize integrated circuit power supply current in circuits that are replicated many times, such as photosite cells 800 in a linear sensor array 700. A reference level is determined by using a portion 16 of the replicated circuit 800, providing monitoring of its performance as a function of the period of the master clock 12 and providing feedback to adjust that performance until the desired level of circuit delay or performance is obtained. While disclosed as being utilized with specific replicated photosite cells 800 in a specific linear sensor array 700, the disclosed current source generator 10 could be utilized with other replicated photosite cells in other linear sensor arrays or any integrated chip or group of discrete circuits where one of the circuits is replicated to many times and the power utilized by the circuit at different frequencies is desired to be minimized within the scope of the disclosure.

Although the current source generator circuit has been described in detail with reference to a certain embodiments, variations and modifications exist within the scope and spirit of the present disclosure as described and defined in the following claims.

What is claimed is:

1. A current source generator utilizing a portion of an analog circuit to drive the analog circuit to complete an analog function cyclically, the current source generator comprises:
   a portion of an analog circuit;
   a control clock circuit used to start and stop operation of the portion of the analog circuit;
   a detection circuit configured to determine when an analog function of the analog circuit is completed and provide an output indicative of the completion of the analog function;
   a phase weighted integrating circuit driven by the output of the detection circuit and configured to set an analog level that is a function of the analog function completion time;
   a current source that utilizes the analog level set by the integrating circuit as a reference level for driving the analog circuit to induce the analog circuit to complete the analog function at a desired speed; and
   a multiplier circuit configured to adjust the analog level set by the phase weighted integrating circuit to modify the analog function completion time proportionally in the analog circuit, wherein the phase weighted integrating circuit is configured to set the analog level at a value that induces the analog circuit function to take less than one half cycle of the control clock speed of operation for completion.

2. The current source generator of claim 1 wherein the analog circuit completes the analog function with a frequency which may vary and the analog circuit includes a master clock having a master clock period driving the analog circuit to complete the analog function and wherein the current source utilizes the analog level set by the integrating circuit to drive the analog circuit to complete the analog function in a fraction or multiple of the master clock period.

3. The current source generator of claim 1 wherein a component of the portion of the analog circuit is replicated in the current source generator.

4. The current source generator of claim 3 wherein the component is a component of an amplifier circuit of the analog circuit.

5. The current source generator of claim 4 wherein the portion of the replicated circuit includes a charge storage device for storing charge generated by the amplifier circuit.

6. The current source generator of claim 1 wherein the detection circuit comprises a comparator configured to compare an output of the analog circuit to a reference to determine when the analog function is completed.

7. The current source generator of claim 6 wherein the output of the detection circuit is a digital signal.

8. The current source generator of claim 1 wherein the detection circuit and phase weighted integrating circuit cooperate to provide negative feedback to current source to induce the analog level to settle at an equilibrium level that is a function of a cycle time needed to complete operation of the analog circuit.

9. A current source generator utilizing a portion of a replicated analog circuit to drive the replicated analog circuit to complete an analog function cyclically, the current source generator comprising:
   a master clock having a master clock speed of operation;
   a portion of a replicated analog circuit, the portion of the replicated analog circuit generating an analog output signal corresponding to an analog function performed by the portion of the replicated analog circuit;
   a current source configured to drive the portion of the replicated analog circuit to completion of the analog function at a speed corresponding to an analog level of an analog reference signal;
   a feedback loop including:
      a comparator configured to receive the analog output signal and to generate a digital completion signal indicative of the analog function being completed by the portion of the replicated analog circuit; and
      a phase weighted integrating circuit configured to receive the digital completion signal and to generate the analog reference signal with an analog level that causes the current source for the portion of the replicated analog circuit to drive the portion of the replicated analog circuit to completion of the analog function at a speed of less than one half cycle of the master clock speed of operation.

10. The current source generator of claim 9 further comprising:
    a control circuitry clocked by the master clock, the control circuitry being configured to control starting and resetting of the analog function.

11. The current source generator of claim 9 wherein the feedback loop provides negative feedback to the current source used to drive the replicated analog circuit.

12. The current source of claim 9 wherein the phase weighted integrating circuit and the comparator each comprise semiconductor devices and the completion speed of the analog circuit function is insensitive to semiconductor processes and operating conditions.

13. The current source generator of claim 9, the portion of the replicated analog circuit comprising a source transistor and a hold capacitor of a cascode amplifier of a pixel circuit.

14. The current source generator of claim 13, the source transistor and the hold capacitor comprising the current source configured to drive the portion of the replicated analog circuit.

15. The current source generator of claim 14, the current source configured to drive the portion of the replicated analog circuit further including a second source transistor.

* * * * *